(12) United States Patent
Guitari et al.

(10) Patent No.: US 10,221,840 B2
(45) Date of Patent: Mar. 5, 2019

(54) MODULAR ELECTRIC COMPRESSOR INCLUDING A BUILT-IN SECURING DEVICE

(75) Inventors: Imed Guitari, Elancourt (FR); Augustin Bellet, Clairfontaine en Yvelines (FR); Hironobu Deguchi, Higashimatsuyama (JP); Hiroaki Okakura, Higashimatsuyama (JP)

(73) Assignee: VALEO JAPAN CO. LTD., Kumagaya-Shi (JP)

( * ) Notice: Subject to any disclaimer, the term of this patent is extended or adjusted under 35 U.S.C. 154(b) by 513 days.

(21) Appl. No.: 14/118,339

(22) PCT Filed: Apr. 16, 2012

(86) PCT No.: PCT/EP2012/001630
§ 371 (c)(1),
(2), (4) Date: Mar. 13, 2014

(87) PCT Pub. No.: WO2012/156011
PCT Pub. Date: Nov. 22, 2012

(65) Prior Publication Data
US 2014/0205478 A1    Jul. 24, 2014

(30) Foreign Application Priority Data
May 19, 2011 (FR) ..................... 11 01545

(51) Int. Cl.
H02K 1/18 (2006.01)
H02K 1/20 (2006.01)
(Continued)

(52) U.S. Cl.
CPC ............. *F04B 17/03* (2013.01); *F04B 35/04* (2013.01); *F04B 39/121* (2013.01); *F04B 53/22* (2013.01);
(Continued)

(58) Field of Classification Search
CPC .......... F04B 17/03; F04B 35/04; F04B 39/14; F04B 53/22; F04B 39/12–39/121;
(Continued)

(56) References Cited

U.S. PATENT DOCUMENTS 5,868,175 A * 2/1999 Duff ..................... B67D 7/0486
   141/192
6,808,372 B2 * 10/2004 Makino ................... F04C 28/08
   417/410.1
(Continued)

FOREIGN PATENT DOCUMENTS

EP        2251958 A2    11/2010
JP     2003343438 A     3/2003
(Continued)

OTHER PUBLICATIONS

International Search Report for Application No. PCT/EP2012/001630 dated May 31, 2012, 5 pages.
(Continued)

*Primary Examiner* — Alexander B Comley
(74) *Attorney, Agent, or Firm* — Howard & Howard Attorneys PLLC

(57) ABSTRACT

An electric compressor (7) includes a compression mechanism (3); an electric motor (2) driving the compression mechanism (3), the electric motor having an axis of rotation (X); and an electric motor (2) power supply inverter (1), the inverter (1) being mounted in an inverter housing (10). The compression mechanism (3) is mounted in a compression housing (30), and the electric motor (2) is mounted in a motor housing (20) extending longitudinally along the axis of rotation (X) and having a first end (20P) connected to the inverter housing (10) by a plurality of securing devices (5) extending inside the motor housing (20). The motor housing (20) includes a second end (20S) located opposite the first end (20P) in relation to the electric motor (2) and connected
(Continued)

to the compression housing (30) by a plurality of securing devices (6) different from the above-mentioned securing devices (5).

2 Claims, 3 Drawing Sheets

(51) Int. Cl.
  *H02K 5/12* (2006.01)
  *H02K 7/14* (2006.01)
  *F01C 21/10* (2006.01)
  *F04B 17/03* (2006.01)
  *F04B 35/04* (2006.01)
  *F04B 39/12* (2006.01)
  *F04B 53/22* (2006.01)
  *F04C 18/02* (2006.01)
  *F04C 23/00* (2006.01)
  *H02K 11/33* (2016.01)

(52) U.S. Cl.
  CPC ............ *F04C 23/008* (2013.01); *F01C 21/10* (2013.01); *F04C 18/0215* (2013.01); *F04C 2240/805* (2013.01); *F04C 2240/808* (2013.01); *H02K 1/185* (2013.01); *H02K 1/20* (2013.01); *H02K 5/12* (2013.01); *H02K 7/14* (2013.01); *H02K 11/33* (2016.01)

(58) Field of Classification Search
  CPC ................. F04B 53/16; F04C 2240/30; F04C 2240/403; F04C 18/0207–18/0238; F04C 23/008; F04C 29/12; F04C 2240/805; F04C 2240/808; H02K 11/33; F01C 21/10

USPC ... 417/410.1, 410.3, 410.4, 410.5, 366, 360, 417/423.14, 423.15
  See application file for complete search history.

(56) References Cited

U.S. PATENT DOCUMENTS

| | | | |
|---|---|---|---|
| 2002/0025265 A1* | 2/2002 | Ikeda | F04B 39/06 417/410.1 |
| 2006/0239833 A1* | 10/2006 | Park | F04B 27/0895 417/269 |
| 2009/0162222 A1* | 6/2009 | Iguchi | F04C 18/0215 417/410.1 |
| 2010/0290932 A1* | 11/2010 | Tsuboi | H02K 3/46 417/410.1 |
| 2012/0063935 A1 | 3/2012 | Fujimura et al. | |

FOREIGN PATENT DOCUMENTS

| | | |
|---|---|---|
| JP | 2005291004 A | 10/2005 |
| WO | WO2010131671 A1 | 11/2010 |

OTHER PUBLICATIONS

English language abstract and machine-Assisted English translation for JP2003343438 extracted from the PAJ database on Apr. 21, 2014, 26 pages.

English language abstract and machine-Assisted English translation for JP2005291004 extracted from the PAJ database on Apr. 21, 2014, 23 pages.

English language abstract for WO2010131671 extracted from espacenet.com database on Apr. 21, 2014, 30 pages.

* cited by examiner

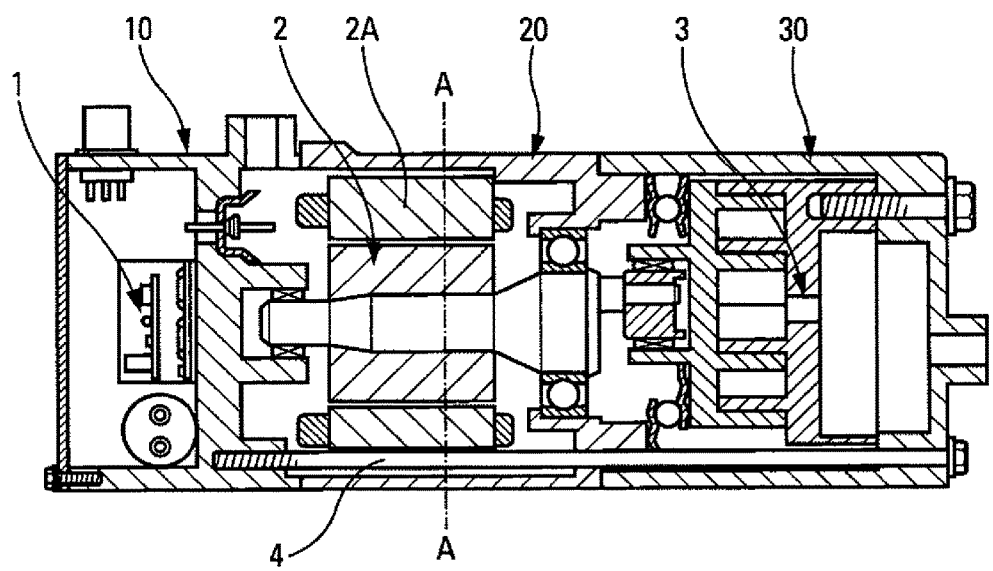
Fig. 1 -Prior Art
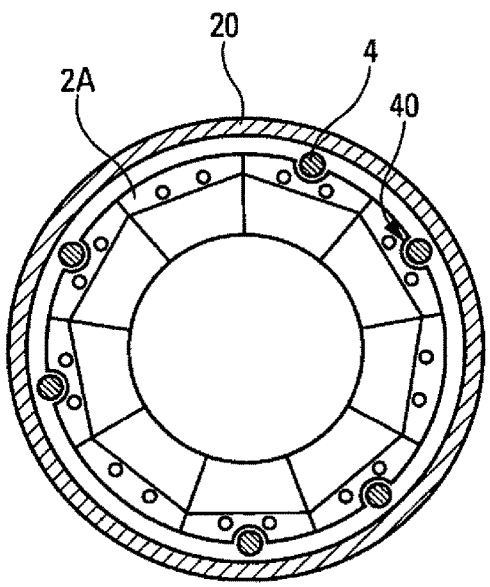
Fig. 2 -Prior

MODULAR ELECTRIC COMPRESSOR INCLUDING A BUILT-IN SECURING DEVICE

RELATED APPLICATIONS

This application is the National Stage of International Patent Application No. PCT/EP2012/001630, filed on Apr. 16, 2012, which claims priority to and all the advantages of French Patent Application No. FR 11/01545, filed on May 19, 2011, the content of which is incorporated herein by reference.

The technical sector of the present invention is that of the electric compressors with which a motor vehicle is equipped, for example, to circulate a refrigerant in a vehicle air conditioning circuit.

An electric compressor conventionally comprises a compression mechanism, driven by an electric motor, in order to pressurize the refrigerant in the air conditioning circuit. To power the electric motor, the compressor also comprises an inverter to convert the electrical energy of the motor vehicle into electrical energy suitable for the motor of the compressor. As an example, the inverter is designed to convert a single-phase current into a three-phase current.

Such compressors are known in the literature. The document JP2003-343438A describes an electric compressor (not represented) comprising a compression housing in which the compression mechanism is mounted, a motor housing in which the electric motor is mounted and an inverter housing in which the inverter is mounted. To link the housings together, the outer surfaces of the housings comprise fastening flanges designed to allow for the passage of fastening screws. The fastening screws are thus used to securely attach the fastening flange of the motor housing to that of the inverter housing. The fastening flanges protrude from the outer surfaces of the housings which increases the bulk of the electric compressor. Furthermore, the protruding fastening flanges can come into contact with other components of the motor and damage them which is a drawback.

To eliminate at least some of these drawbacks, it has been proposed to fasten the housings to one another with fastening screws extending inside the housings. FIG. 1 represents a cross-sectional view of an electric compressor, described in the document JP2005-291004, in which the inverter housing 10 housing the inverter 1, the motor housing 20 housing the electric motor 2 and the compression housing 30 housing the compression mechanism 3 are linked to one another by using long fastening screws 4 which extend inside the motor housing 20.

Long fastening screws present many drawbacks. They have a high manufacturing cost compared to short screws. Furthermore, during their manufacture, the fastening screws undergo a thermal hardening step which generates residual surface tensions which are a function of the length of the fastening device and which result in bending or buckling of the fastening device. The longer the fastening screw, the more difficult it is to manufacture.

The aim of the present invention is to eliminate at least some of the drawbacks described above by modifying the assembly of the compressor. This advantageously makes it possible to assemble the compressor without having to use very long fastening screws.

To this end, the invention relates to an electric compressor comprising a compression mechanism, an electric motor driving the compression mechanism, said electric motor having an axis of rotation, an inverter powering said electric motor, the inverter being mounted in an inverter housing, the compression mechanism being mounted in a compression housing, the electric motor being mounted in a housing extending longitudinally along the axis of rotation and having a first end linked to the inverter housing by a plurality of fastening devices extending inside the motor housing, in which compressor the motor housing has a second end opposite the first end relative to the electric motor, linked to the compression housing by a plurality of securing devices which are different from the fastening devices.

Assembling the compressor by means of distinct fastening and securing devices makes it possible to use short devices which have a low manufacturing cost and an easy manufacturing method.

Preferably, each fastening device has a longitudinal length less than the longitudinal length of the motor housing. Such a fastening device has a very reduced length which is advantageous.

Preferably, the plurality of securing devices extends inside the compression housing. The compressor does not have any protruding parts and thus has a small bulk.

Preferably, the second end of the motor housing takes the form of a transversal planar base, said base comprising a plurality of longitudinal cavities for positioning a fastening device.

Thus, the fastening device is oriented longitudinally in the motor housing when it is positioned in its cavity.

Advantageously, each fastening device comprises a body extending into a hole in the motor housing and a head in abutment with the bottom of the longitudinal positioning cavity.

The positioning cavities advantageously make it possible to limit the length of a fastening device, which is advantageous.

According to one aspect of the invention, the second end of the motor housing takes the form of a transversal planar base, said base comprising a plurality of tappings for receiving a securing device.

The securing devices are received by the base whereas the fastening devices are introduced into the base. The base advantageously ensures an optimal mechanical fastening of the compressor assembly by forming a fastening interface for the securing and fastening device.

Preferably, at least one tapping is formed in the base between two consecutive cavities so as to distribute the fastening devices and the securing devices over the base. Advantageously, the fastening devices do not interfere with the securing devices.

More preferably, the second end of the motor housing takes the form of a transversal planar base, said base comprises at least one through opening arranged to guide a refrigerant toward the compression means. The base advantageously provides a function for guiding the refrigerant without interfering with the fastening and securing devices.

Preferably, the diameter of the fastening devices is less than the diameter of the securing devices.

Given that the pressure in the inverter housing is lower than that in the compression housing, fastening devices of smaller dimensions and bulk can be used.

More preferably, the number of fastening devices is less than the number of securing devices.

Given that the pressure in the inverter housing is lower than that in the compression housing, a restricted number of fastening devices can be used. This advantageously makes it possible to limit the weight of the compressor.

According to another aspect of the invention, the inverter housing comprises a plurality of excrescences extending longitudinally into the motor housing, each excrescence comprising a tapped hole for receiving a fastening device.

The excrescences advantageously make it possible to limit the length of the fastening devices which is advantageous. This also avoids having the excrescences extend into the cavity of the inverter housing and encroach on the space available for installing the inverter, in particular, an inverter printed circuit board.

Preferably, the excrescences are in contact with the internal periphery of the motor housing. The excrescences thus make it possible to center the inverter housing relative to the motor housing.

The invention will be better understood on reading the following description, given solely as an example, and by referring to the appended drawings in which:

FIG. 1 is an axial cross-sectional view of an electric compressor according to the prior art;

FIG. 2 is a transversal cross-sectional view of the compressor of FIG. 1 along the plane A-A;

An electric compressor 7 according to the invention will be described hereinbelow for the circulation of a refrigerant in an air conditioning circuit of a motor vehicle. It goes without saying that the electric compressor may be used for the compression of fluids of different kinds and that the electric compressor 7 may be mounted on any type of device, both mobile and stationary.

Figure 3:
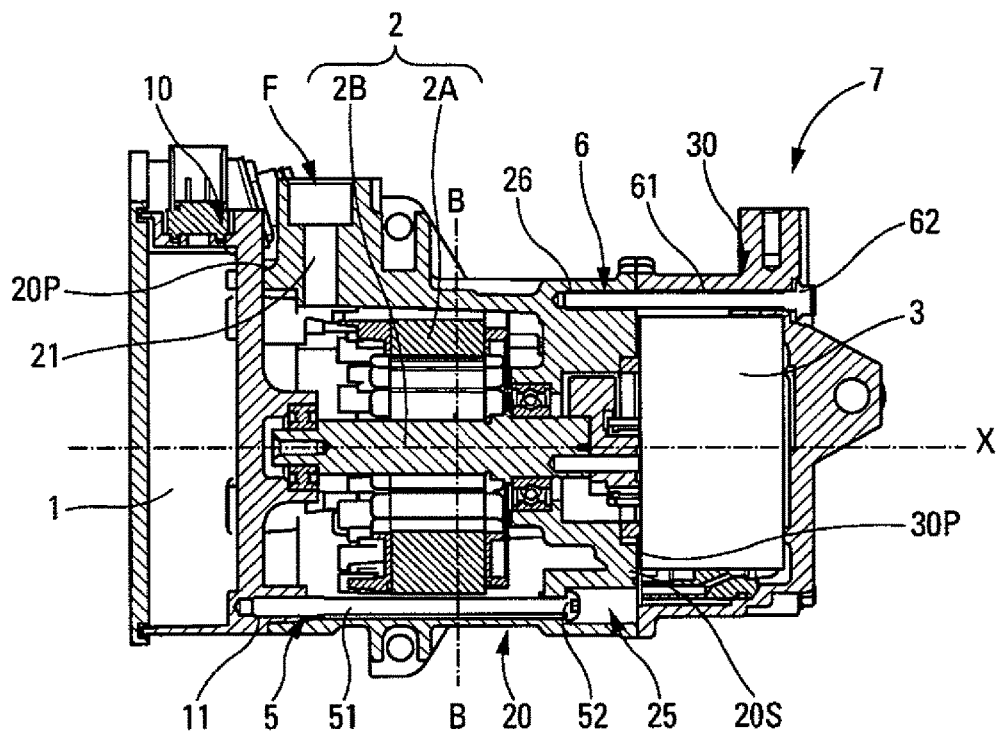
FIG. 3 is an axial cross-sectional view of an electric compressor according to the invention.

Referring to FIG. 3, the electric compressor 7 according to the invention comprises a compression mechanism 3, an electric motor 2 driving the compression mechanism 3, said electric motor 2 having an axis of rotation X (FIG. 3) and an inverter 1 powering said electric motor 2. The inverter 1 is mounted in an inverter housing 10 and the compression mechanism 3 is mounted in a compression housing 30. The electric motor 2 is mounted in a motor housing 20 extending longitudinally along the axis of rotation X. The motor housing 20 is made of aluminum or an aluminum alloy of hollow circular form comprising a peripheral wall which delimits an internal volume terminated on one side by a first end 20P and on the other by a second end 20S. These two ends 20P, 20S are open before the other components of the compressor 7 are mounted. The first end 20P is linked to the inverter housing 10 by a plurality of fastening devices 5 whereas the second end 20S, opposite the first end 20P relative to the electric motor 2, is linked to the compression housing 30 by a plurality of securing devices 6.

The compression mechanism 3 is of the compression scroll type or of the paddle type or even of the piston type, these examples being given by way of illustration without in any way limiting the scope of the invention. The inverter 10 converts a direct current originating from the vehicle, in particular from the battery, into a sinusoidal current of variable frequency powering the electric motor 2.

Figure 4:
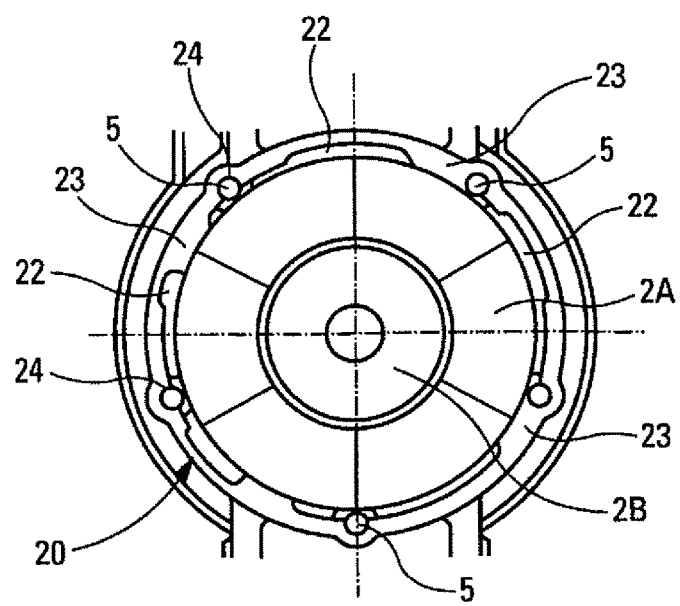
FIG. 4 is a transversal cross-sectional view of the compressor of FIG. 3 on the plane B-B.

As represented in FIGS. 3 and 4, the motor 2 comprises a stator 2A with a fully circular periphery mounted securely in the motor housing 20 and a rotor 2B securely attached to the shaft of the motor 2 which rotates inside the stator 2A. In other words, the stator 2A is placed in a fixed manner outside the rotor 2B. The circular form of the stator 2A is advantageous because it limits the magnetic losses and optimizes the efficiency of the motor 2. Hereinafter, the terms "internal" and "external" are defined radially relative to the axis X of the motor 2. Thus, an axial cylinder comprises an internal surface turned toward the axis and an external surface opposite its internal surface.

Referring to FIG. 4, the motor housing 20 comprises, on its internal periphery, a plurality of protuberances 23 in contact with the circular periphery of the stator 2A. In this example, the protuberances 23 take the form of radial teeth, originating on the internal wall of the motor housing 20, the end of which is curvilinear so as to bear surface-wise on the circular periphery of the stator 2A. The protuberances 23 are distributed on the periphery of the motor housing 20 to firmly secure the motor 2 in its housing 20.

The motor housing 20 comprises, on its internal periphery and between two consecutive protuberances 23, a plurality of holes 24 in each of which extends a fastening device 5 as represented in FIG. 4. In this example, each fastening device 5 extends inside the motor housing 20 so as not to form a protruding part outside the compressor 7. The compressor 7 is thus compact. In this example, a single fastening device 5 extends between two consecutive protuberances 23, but it goes without saying that a greater number of such devices could be used between two consecutive protuberances 23. The fastening device 5 is thus totally inscribed within the thickness of the motor housing 20 measured in line with a protuberance 23, that is to say, the radial thickness of the protuberance 23.

It can be seen in FIG. 4 that the motor housing 20 comprises, also on its internal periphery and between two consecutive protuberances, a plurality of recesses 22, the function of which is to permit circulation of the refrigerant in the direction of the axis X of the motor 2.

As represented in FIG. 3, the motor housing 20 comprises a refrigerant intake orifice 21 which emerges between the electric motor 2 and the inverter housing 10 in order to introduce refrigerant F into the motor housing 20. This intake orifice 21 takes the form of a nozzle which extends radially outward from the motor housing 20 and a through hole formed in the wall of the motor housing 20 in line with the nozzle. The recesses 22 are suitable for ducting the refrigerant F between the internal periphery of the motor housing 20 and the external periphery of the stator 2A. This duct has a sufficient bore section to make it possible to cool the stator 2A by the circulation of the refrigerant F without causing any head loss. Advantageously, the fastening devices 5 and the stator 2A of the motor 2 do not disturb the circulation of the refrigerant F which guarantees an optimum flow of the refrigerant.

By virtue of the presence of radial protuberances 23 outside the stator 2A, an annular space is advantageously formed between the periphery of the motor housing 20 and the periphery of the stator 2A in order to allow for the formation of the holes 24 and recesses 22 that make it possible, on the one hand, to fasten the compressor 7 and, on the other hand, for the refrigerant F to circulate.

Figure 8:
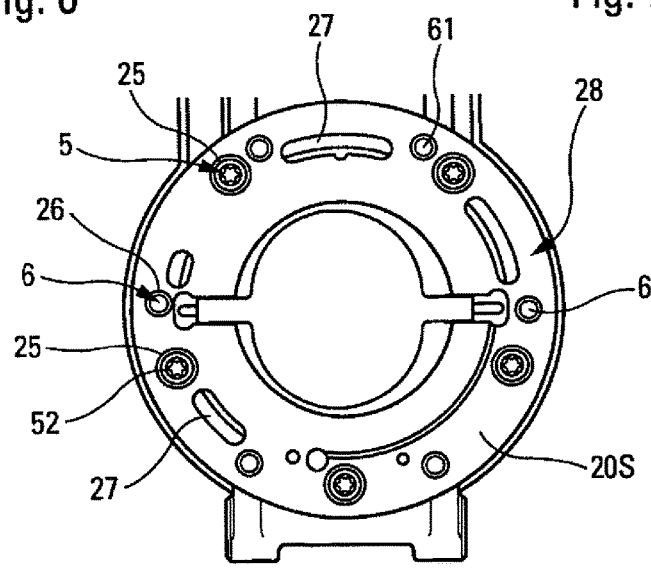
FIG. 8 is a transversal cross-sectional view of the interface between the motor housing and the compression housing of the compressor according to the invention.

The second end 20S of the motor housing 20 takes the form of a transversal planar base 28 as represented in FIG. 8. The base 28 comprises, in this example, a plurality of longitudinal cavities 25 for positioning the fastening devices 5, a plurality of through openings 27 arranged to guide the flow of refrigerant circulating in the recesses 22 toward the compression housing 30 and a plurality of tappings 26 formed longitudinally in the base 28 to receive securing devices 6 for securing the compression housing 30 to the motor housing 20.

Figure 5:
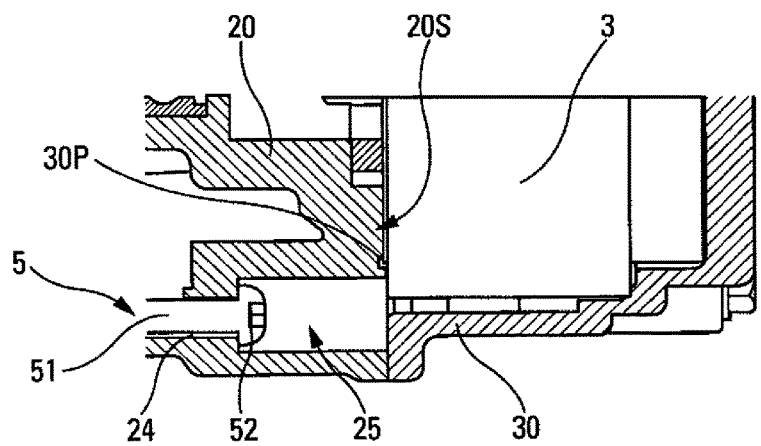
FIG. 5 is a close-up view of the interface between the motor housing and the compression housing of the compressor of FIG. 3.

With reference more particularly to FIG. 5, the longitudinal cavities 25 are formed on the periphery of the base 28 and the hole 24 is formed in the extension of each longitudinal cavity 25. Preferably, each fastening device 5 comprises a longitudinal body 51 extending into the hole 24 and a head 52 in abutment with the bottom of the longitudinal positioning cavity 25. The fastening device 5, in this example, takes the form of a fastening screw whose body 51 is threaded in order to be able to extend into the hole 24 and is screwed into an excrescence 11 of the inverter housing 10, as will be described hereinbelow. Thus, each fastening device 5 extends into a hole 24 of the motor housing 20. Each longitudinal cavity 25 has a transversal section of circular form suited to the diameter of the head 52 of the fastening device 5 as represented in FIG. 5, the transversal section of the hole 24 into which extends the body 51 being smaller than that of the longitudinal cavity 25. The axial length of the longitudinal cavity 25 advantageously makes it possible to limit the length of the body 51 of the fastening device 5. In practice, the longitudinal length of the fastening device 5 is shorter than the longitudinal length of the motor housing 20 because of the presence of the longitudinal cavities 25 which extend inside the volume of the motor housing 20 and make it possible for the head 52 of the fastening device 5 to be in abutment with a wall situated inside the motor housing 20.

As described previously, during its manufacture, the fastening devices 5 undergo a thermal hardening step which generates residual surface tensions which are a function of the length of the fastening device. The shorter the fastening device, the easier it is to manufacture.

Still referring to FIG. 5, the compression housing 30 comprises a planar surface portion 30P, extending transversely to the axis of the motor X, which comes into contact with the planar surface of the base 28 in order to form a seal with respect to the refrigerant F circulating in the motor housing 20 and the compression housing 30. There is thus no need to provide individual gaskets for each fastening device 5, the link from the compression housing 30 to the motor housing 20 ensuring the seal-tightness without additional means.

As represented in FIG. 8, the plurality of through openings 27 of the base 28 advantageously makes it possible to guide the refrigerant F taken in through the intake orifice 21 toward the compression housing 30. The recesses 22 of the motor housing 20 are suitable for ducting the refrigerant F from the intake orifice 21 to a through opening 27 of the base 28 to form a duct inside the motor housing 20 whose bore section is sufficient to limit the head losses. In this example, the through openings 27 extend longitudinally and have an axial section which takes the form of circular arcs formed on the base 28 at one and the same radial distance from the axis X of the motor 2 (FIG. 8). It goes without saying that the through openings 27 could take various forms in order to optimally calibrate the pressure of the refrigerant in the motor housing 20.

The tappings 26 of the base 28 extend longitudinally to receive securing devices 6 for securing the compression housing 30 to the motor housing 20. The securing devices 6 extend inside the compressor in the compression housing 30. Preferably, each securing device 6 comprises a longitudinal body 61 extending at least partially into the tapping 26 and a head 62 in abutment against a transversal face of the compression housing 30. The securing device 6, in this example, takes the form of a fastening screw whose body 61 is threaded in order to be able to be screwed into the tapping 26 of the base 28. The tappings 26 are distributed on the base 28 and are, preferably, interleaved with the positioning cavities 25. Preferably, at least one tapping 26 is formed in the base 28 between two consecutive cavities 25 so as to distribute the fastening devices 5 and the securing devices 6 on the base 28.

The compressor 7 according to the invention is modular. The inverter housing 10 and the motor housing 20 are securely attached during a first step by the fastening devices 5. Then, the motor housing 20 and the compression housing 30 are securely attached during a second step by the securing devices 6. Such mounting is simple to implement and makes it possible to benefit from a modular architecture in which each module can be designed, tested and validated independently. Furthermore, this advantageously makes it possible to use only fastening and securing devices of short length which are inexpensive and have a better lifespan.

The base 28 of the motor housing 20 advantageously fulfills a link interface function by making it possible, on the one hand, to introduce the fastening devices 5 and, on the other hand, to receive the securing devices 6. The base 28 also allows for the circulation of the refrigerant F between the motor housing 20 and the compression housing 30.

Given that the pressure in the motor housing 20 is lower than that in the compression housing 30, the securing devices 6 have to provide a better hold than that provided by the fastening devices 5. To this end, in order to limit the overall weight of the compressor 7 and its bulk, the diameter of the fastening devices 5 can be less than the diameter of the securing devices 6 and the number of fastening devices 5 can be less than the number of securing devices 6.

Figure 6:
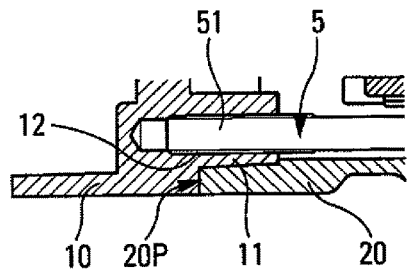
FIG. 6 is a close-up view of the interface between the motor housing and the inverter housing of the compressor of FIG. 3.
Figure 7:
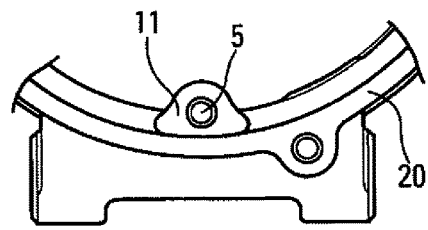
FIG. 7 is a transversal cross-sectional view of the interface between the motor housing and the inverter housing of the compressor according to the invention.

Referring to FIGS. 3, 6 and 7, the inverter housing 10 comprises a plurality of excrescences 11, of substantially tubular form, in contact with the internal periphery of the motor housing 20, extending longitudinally in the motor housing 20, each excrescence 11 comprising a hole 12 for receiving a fastening device 5. In this example, the receiving holes 12 are blind and tapped in order to receive the end of the threaded body 51 of the fastening devices 5.

The excrescences 11 of the inverter housing 10 advantageously fulfill a dual function. Firstly, they make it possible to accurately position the inverter housing 10 relative to the motor housing 20 given that they are in contact with the internal periphery of the motor housing 20. Secondly, they make it possible to fasten the two housings 10, 20 by limiting the length of the fastening devices 5. In practice, in the manner of the positioning cavities 25 which extend toward the center of the motor housing 20 from the second end 20S, the protuberances 11 extend toward the center of the motor housing 20 from the first end 20P in order to limit the longitudinal length of the fastening devices 5. The shorter the body 51, the easier it is to manufacture.

Furthermore, given that the excrescences 11 extend longitudinally in the motor housing 20, the space available for the electronic components of the inverter 1 in the inverter housing 10 is great and allows for the mounting of a printed circuit board for the inverter 1 with dimensions substantially equal to those of the transversal section of the inverter housing 10.

The invention claimed is:

1. An electric compressor (7) comprising: a compression mechanism (3), an electric motor (2) driving the compression mechanism (3), the electric motor (2) having an axis of rotation (X) and including a stator (2A) and a rotor (2b) which are contained within a space defined in a motor housing (20), an inverter (1) powering the electric motor (2), the inverter (1) being mounted in an inverter housing (10), the compression mechanism (3) being mounted in a compression housing (30), the electric motor (2) being mounted in the motor housing (20), the motor housing (20) extending longitudinally along the axis of rotation (X) and having a first end (20P) linked to the inverter housing (10) by a plurality of fastening devices (5) extending inside the motor housing (20) and within a motor chamber, wherein the motor housing (20) has a second end (20S) opposite the first end (20P) relative to the electric motor (2), linked to the compression housing (30) by a plurality of securing devices (6) which are different from the fastening devices (5), wherein the plurality of fastening devices (5) and the plurality of securing devices (6) are both inserted into the motor housing (20) from a side opposite the inverter housing (10);

and wherein the second end (20S) of the motor housing (20) takes the form of a transversal planar base (28), and wherein the base (28) comprises at least one through opening (27) arranged to guide a refrigerant (F) toward the compression mechanism (3).

2. The electric compressor (7) of claim 1, wherein the base (28) comprises a plurality of tappings (26) and a plurality of through holes (24), wherein at least one of the plurality of tappings (26) is for receiving a corresponding one of the plurality of securing devices (6) and wherein in each of the plurality of through holes (24) extends one of the plurality of fastening devices (5), wherein the tappings (26) are distributed on the base (28) so as to be interleaved with the through holes (24).

* * * * *